3,426,598
MANOMETERS
Peter Edward Bagley, Henley-on-Thames, England, assignor to Airflow Developments Limited, High Wycombe, Buckinghamshire, England, a British company
Filed Mar. 31, 1966, Ser. No. 539,008
Claims priority, application Great Britain, Apr. 1, 1965, 13,818/65
U.S. Cl. 73—401　　　　　　　　　　　　　　1 Claim
Int. Cl. G01l 7/18

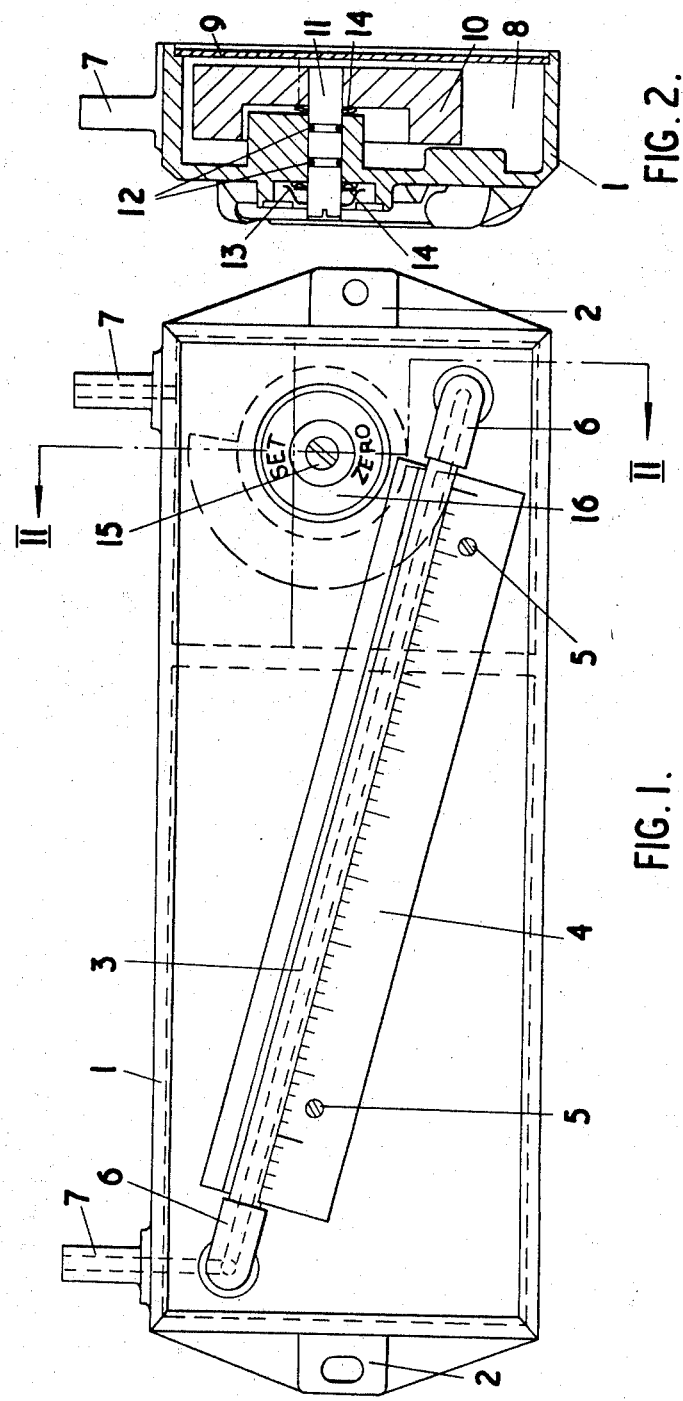

ABSTRACT OF THE DISCLOSURE

A manometer comprising a measuring tube mounted beside a graduated scale and containing liquid supplied from a reservoir in a manometer casing, there being a flat element mounted in the reservoir and movable therein to displace a varying volume of liquid in said reservoir and thereby adjust for zeroing purposes the position of the meniscus in the measuring tube.

---

This invention relates to manometers and more particularly, but not exclusively, to manometers such as are used in industrial and domestic air conditioning, heat and ventilating plants. These manometers comprise a measuring tube mounted beside a graduated scale and containing liquid supplied from a reservoir in the manometer casing, and it is necessary to adjust the position of the liquid meniscus in the tube to zero on the scale before the pressure to be measured is applied.

The general object of the present invention is to provide an improved manometer having particularly convenient means for adjusting the meniscus position on the scale.

In accordance with the present invention therefore, a manometer comprises a casing, a measuring tube mounted on the casing and connected to a liquid reservoir in the casing and an element mounted in the reservoir and movable from outside the casing to displace a varying volume of liquid in the reservoir and thereby adjust the position of the meniscus in the measuring tube. Preferably the element is of arcuate or part-annular shape and is rotatable to vary the volume of liquid displaced. Such rotation does not appreciably change the surface area of the liquid in the reservoir and therefore does not change the proportional relationship between the scale graduations and the pressure being measured. Moreover, in accordance with a further feature of the invention, the measuring tube may be located in or by a groove in a face plate or the casing of the instrument and be secured thereto by a strip of material bearing a graduated scale.

One particular and at present preferred embodiment of the invention, to be described by way of example, is illustrated in the accompanying drawings, in which:

FIGURE 1 is a front elevation of the improved manometer; and

FIGURE 2 is a section on line II—II of FIGURE 1.

Referring now to these drawings, the manometer comprises a metal casing 1 formed with pierced end lugs 2 by which it may be attached, for instance by means of screws, to a wall surface. It will be seen that the casing is horizontally elongated and of flat conformation between vertical planes. The front vertical face of the casing is formed with a shallow groove for locating the manometer measuring tube 3 and a recessed part for accommodating a strip of material constituting a scale 4 alongside the tube, the scale being secured to the face of the casing by screws 5 and also serving to retain the tube 3 in position. The front face of the casing 1 is also recessed and perforated to accommodate tubular elbows to which the measuring tube is connected by moulded plastic sleeves 6.

The top face of the casing incorporates at each end t union 7 to be coupled alternatively to the pressure or pressure difference which is to be measured, one union being in communication with the measuring tube 3 and the other union being in communication with a liquid reservoir 8 (FIGURE 2) at the other end of the casing 1, which is closed by a sealed backing plate 9.

This reservoir 8, which communicates with the lower end of the measuring tube 3, contains an element or lobe 10 which is of part circular shape having flat surfaces and which is mounted on a spindle 11 extending to the front face of the casing. A liquid-tight seal between the spindle 11 and the casing 1 is ensured by a pair of O-rings 12 mounted in grooves in the spindle which is held in place by a spring washer 13 and carries bearing washers 14 between the lobe 10 and the casing 1 and the casing 1 and the spring washer 13. The frontally visible end of the spindle has a screwdriver slot 15 and is surrounded by an annulus on the casing face, bearing the legend "SET-ZERO." It will be appreciated from the foregoing that the element 10 is mounted vertically in the reservoir 8 and is movable in its own plane from outside the casing 1.

The lobe 10 is at all times partially immersed in the liquid in the reservoir 8 and the amount of liquid which it displaces and thereby the position of the liquid meniscus in the measuring tube 3 can be adjusted by turning the spindle 11 up to a total of 110° using the screwdriver slot 15.

I claim:
1. A manometer comprising a casing which is horizontally elongated and of flat conformation between vertical planes, a liquid reservoir defined within the casing, a measuring tube mounted on the casing and communicating with said reservoir whereby a liquid in said reservoir extends into said measuring tube and forms a meniscus therein, and inlet and an outlet communicating respectively with said liquid reservoir and said measuring tube, and an element having flat surfaces partially immersed in said liquid and mounted vertically in said reservoir, and a spindle which projects to the front of the casing connected to said element to rotate it in its own plane to displace a varying volume of liquid in said reservoir and thereby adjust the position of the meniscus in the measuring tube.

References Cited

UNITED STATES PATENTS 2,983,146　5/1961　Wilson _____ 73—401
3,023,622　3/1962　Hezarifend _____ 73—401

FOREIGN PATENTS 1,182,973　1/1959　Great Britain.

S. CLEMENT SWISHER, Primary Examiner.
D. D. WOODIEL, Assistant Examiner.